United States Patent
Yin et al.

(10) Patent No.: US 12,518,000 B2
(45) Date of Patent: Jan. 6, 2026

(54) DATA PROCESSING METHODS AND APPARATUS SWITCHABLE BETWEEN SECURE AND NON-SECURE ENVIRONMENTS

(71) Applicant: HUAWEI TECHNOLOGIES CO., LTD., Guangdong (CN)

(72) Inventors: Wen Yin, Shenzhen (CN); Hong Li, Wuhan (CN); Yingxin Qiu, Shenzhen (CN); Xiaowei Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 346 days.

(21) Appl. No.: 18/067,797

(22) Filed: Dec. 19, 2022

(65) Prior Publication Data

US 2023/0185901 A1 Jun. 15, 2023

Related U.S. Application Data

(63) Continuation of application No. PCT/CN2021/102236, filed on Jun. 25, 2021.

(30) Foreign Application Priority Data

Jun. 28, 2020 (CN) .......................... 202010598730.1
Sep. 29, 2020 (CN) .......................... 202011051770.0

(51) Int. Cl.
  *G06F 21/00* (2013.01)
  *G06F 21/53* (2013.01)

(52) U.S. Cl.
  CPC ...... *G06F 21/53* (2013.01); *G06F 2221/2105* (2013.01)

(58) Field of Classification Search
  None
  See application file for complete search history.

(56) References Cited

U.S. PATENT DOCUMENTS

| 9,183,412 B2* | 11/2015 | Bye .......................... G06F 21/74 |
| 11,107,047 B2* | 8/2021 | Kim .................... G06Q 20/3674 |
| 11,755,753 B2* | 9/2023 | Leitao ................. G06F 9/45558 |
| | | 713/189 |

(Continued)

FOREIGN PATENT DOCUMENTS

| CN | 103870336 A | 6/2014 |
| CN | 107633394 A | 1/2018 |

*Primary Examiner* — Jeffery L Williams

(57) ABSTRACT

A data processing host includes a program running environment and a first isolation environment. The first isolation environment is isolated from the program running environment. The host operates in a non-secure mode in the program running environment, and operates in a secure mode in the first isolation environment. The program running environment includes a virtual instance operating in the non-secure mode, and the first isolation environment corresponds to the virtual instance in the program running environment. The first isolation environment includes an operating system in the secure mode and a resource allocated to the first isolation environment and comprising a first isolation space for running the operation system and a secure processing program, which corresponds to a program in the virtual instance and is for processing to-be-processed data.

20 Claims, 5 Drawing Sheets

(56) References Cited

U.S. PATENT DOCUMENTS

| | | | | |
|---|---|---|---|---|
| 2014/0165216 A1* | 6/2014 | Kwag | G06F 21/74 | 726/30 |
| 2015/0058191 A1* | 2/2015 | Khan | G06Q 20/4016 | 705/35 |
| 2015/0089502 A1* | 3/2015 | Horovitz | G06F 9/45558 | 718/1 |
| 2015/0095238 A1* | 4/2015 | Khan | G06Q 20/382 | 705/71 |
| 2015/0142665 A1* | 5/2015 | Dicker | G06Q 20/385 | 705/64 |
| 2016/0253652 A1* | 9/2016 | Je | G06Q 20/38215 | 705/39 |
| 2017/0068953 A1* | 3/2017 | Kim | G06Q 20/3278 | |
| 2017/0164201 A1* | 6/2017 | Li | G06F 21/57 | |
| 2019/0042796 A1* | 2/2019 | Von Bokern | G06F 9/45558 | |
| 2019/0384923 A1* | 12/2019 | Leitao | G06F 21/606 | |
| 2020/0201786 A1* | 6/2020 | Ouziel | G06F 12/0246 | |
| 2020/0409734 A1* | 12/2020 | Sahita | G06F 9/45533 | |
| 2021/0110064 A1* | 4/2021 | Ibrahim | H04L 9/14 | |
| 2021/0200858 A1* | 7/2021 | Caspi | G06F 21/6218 | |
| 2021/0279334 A1* | 9/2021 | Kim | G06F 15/7807 | |
| 2022/0171648 A1* | 6/2022 | Rodriguez | G06F 9/45533 | |
| 2023/0185901 A1* | 6/2023 | Yin | G06F 21/53 | 726/1 |
| 2024/0045709 A1* | 2/2024 | Sahita | G06F 9/5005 | |
| 2024/0220274 A1* | 7/2024 | Shanbhogue | G06F 21/78 | |
| 2024/0220621 A1* | 7/2024 | Huntley | G06F 21/53 | |

* cited by examiner

DATA PROCESSING METHODS AND APPARATUS SWITCHABLE BETWEEN SECURE AND NON-SECURE ENVIRONMENTS

CROSS-REFERENCE TO RELATED APPLICATIONS

This application is a continuation of International Application PCT/CN2021/102236, filed on Jun. 25, 2021, which claims priority to Chinese Patent Application No. 202010598730.1, filed on Jun. 28, 2020, and Chinese Patent Application No. 202011051770.0, filed on Sep. 29, 2020. All of the aforementioned priority applications are hereby incorporated by reference in their entirety.

TECHNICAL FIELD

This application relates to the field of Internet technologies (IT), and in particular, to a data processing method, host, and apparatus.

BACKGROUND

A virtual machine is a complete computer system that is simulated by software modules, has complete hardware system functions, and runs in an environment. In other words, the virtual machine may be considered as a complete computer system, and may be used to run a program, and process to-be-processed data by running the program.

Currently, some programs and to-be-processed data need to be run and processed in a running environment with relatively high security. However, currently a virtual machine is used to run the program and process the to-be-processed data, but the virtual machine cannot provide the running environment with relatively high security. This may reduce data processing security.

For example, it is assumed that a program is a transfer program, and to-be-processed data includes data such as accounts of both parties in a transfer and a transfer amount. A virtual machine may run the transfer program, and complete the transfer based on the to-be-processed data. When the transfer program is run in the virtual machine to process the to-be-processed data, information leakage occurs easily, and a security risk is high.

SUMMARY

This application provides a data processing method, host, and apparatus, to improve data processing security. The technical solutions are as follows:

According to a first aspect, this application provides a data processing host, including a program running environment and a first isolation environment, where the program running environment is an environment in which the host operates in a non-secure mode, and the first isolation environment is an environment in which the host operates in a secure mode. The program running environment includes at least one virtual instance operating in the non-secure mode, and the first isolation environment corresponds to a virtual instance in the program running environment. The first isolation environment includes an operating system in a secure mode and a resource allocated to the first isolation environment. The resource includes a first isolation space and a processor resource. The first isolation space is used to run the operating system and a secure processing program, and store to-be-processed data. The secure processing program corresponds to a program in the virtual instance, and is used to process the to-be-processed data, to implement a secure processing function of the program in the virtual instance. The first isolation space is isolated from the program running environment.

Because the host includes the program running environment and the first isolation environment, for the virtual instance included in the program running environment, the first isolation environment corresponding to the virtual instance includes the operating system in the secure mode and the resource, the resource includes the first isolation space and the processor resource, the first isolation space is used to run the operating system and the secure processing program, and process the to-be-processed data, the secure processing program is a program invoked by the virtual instance, the to-be-processed data is data required for running the secure processing program, and the first isolation space is a space protected by the host in the secure mode. In this way, the first isolation environment is an environment with relatively high security. In the first isolation environment, the security processing program is run, and the secure processing program is used to process the to-be-processed data, thereby improving data processing security.

In a possible implementation, the program running environment is used to provide a hardware resource and/or a software resource required for running the virtual instance, and the first isolation environment is used to provide a hardware resource and/or a software resource required for running the secure processing program.

In another possible implementation, the host further includes a second isolation environment, the second isolation environment includes a first management module and the first isolation environment, and the first management module is configured to manage the first isolation environment. In this way, the isolation environment may be divided into two layers: the first isolation environment and the second isolation environment. In the second isolation environment, first isolation environments corresponding to different virtual instances may be created, and the first isolation environments corresponding to the different virtual instances may be managed by using the first management module, to implement management by using the virtual instance as a granularity, thereby implementing refined management.

In another possible implementation, the first isolation space is an isolation running environment that is used only to communicate with the virtual instance corresponding to the first isolation space, and cannot be accessed by another virtual instance.

In another possible implementation, when the host switches to the secure mode, the first management module is configured to receive task information, where the task information includes an identity of the virtual instance. The first management module is further configured to establish or allocate the first isolation environment corresponding to the virtual instance based on the task information. In this way, the task information may be used to trigger the first management module to establish or allocate the first isolation environment.

In another possible implementation, the first management module is configured to receive the task information sent by a security monitor, where the task information is information obtained by the security monitor in the non-secure mode. A security level of the security monitor is relatively high, and the security monitor transfers the task information in the program running environment in the non-secure mode to the first management module in the secure mode, so that security of transferring the task information can be improved.

In another possible implementation, the task information is generated when a second management module in the program running environment receives an invoking request sent by the virtual instance, and the task information obtained by the security monitor is input by the second management module. In this way, the task information may be securely transferred to the first management module by using the security monitor.

In another possible implementation, the task information further includes an address of a shared memory, and the first management module is further configured to obtain first data based on the address of the shared memory. The first data includes the secure processing program and the to-be-processed data. Because the shared memory is a memory shared by the program running environment and the first isolation environment, the first data in the program running environment in the non-secure mode may be transferred to the first management module by using the shared memory, to ensure that the first management module can establish the first isolation environment based on the first data.

In another possible implementation, the first management module is further configured to adjust an amount of resources included in the first isolation environment corresponding to the virtual instance that runs in the program running environment. In this way, it can be ensured that the amount of resources included in the first isolation environment meets a requirement of running the program processing program to process the to-be-processed data.

In another possible implementation, the first management module releases the first isolation environment corresponding to the virtual instance that runs in the program running environment. In this way, an idle resource may be released for use by another virtual instance.

In another possible implementation, the first management module is configured to: run the operating system in the secure mode in the first isolation space, and run the secure processing program by using the operating system to process the to-be-processed data, to obtain a processing result. In this way, the secure processing program may be run by using the operating system in the first isolation environment to process the to-be-processed data, to ensure that the secure processing program may be run in the first isolation environment, and a one-to-one correspondence between the virtual instance and the first isolation environment can be implemented.

In another possible implementation, the first management module is further configured to: transmit the processing result to the program running environment, and trigger switching of a working mode of the host to the non-secure mode. This ensures that the virtual instance located in the program running environment can obtain the processing result.

In another possible implementation, the first management module inputs task completion information to the security monitor, and the security monitor receives the task completion information and triggers the host to switch the working mode to the non-secure mode.

In another possible implementation, the first management module is further configured to obtain second data, where the second data includes status information and data stored in the first isolation space, the status information is used to describe a running status of the operating system in the first isolation environment and a running status of the secure processing program, and the second data is used to restore the first isolation environment corresponding to the virtual instance on another host. The first management module is further configured to send the second data to the second management module in the program running environment. In this way, the virtual instance can be migrated to the other host, the virtual instance can continue to be run on the other host, and the secure processing program continues to process the to-be-processed data in the first isolation environment, thereby implementing decoupling between the first isolation environment and hardware of the host.

In another possible implementation, the second management module is configured to send the second data to the other host, to restore the first isolation environment corresponding to the virtual instance on the other host. In this way, the virtual instance can be migrated to the other host, the virtual instance can continue to be run on the other host, and the secure processing program continues to process the to-be-processed data in the first isolation environment, thereby implementing decoupling between the first isolation environment and hardware of the host.

In another possible implementation, the host may include a plurality of first isolation environments, and each of the plurality of first isolation environments is in a one-to-one correspondence with a virtual instance in the program running environment. In this way, different virtual instances correspond to different first isolation environments, so that management is performed by using a virtual instance as a granularity, thereby implementing refined management.

In another possible implementation, the first management module is a virtualization management program Hypervisor.

According to a second aspect, this application provides a data processing method. In the method, when a host switches to a secure mode, task information is received, where the task information includes an identity of a virtual instance, the virtual instance is a virtual instance in a program running environment that operates in a non-secure mode, and the program running environment is an environment in which the host operates in the non-secure mode. A first isolation environment corresponding to the virtual instance is established or allocated based on the task information, where the first isolation environment is an environment in which the host operates in the secure mode, the first isolation environment includes an operating system in the secure mode and a resource allocated to the first isolation environment, the resource includes a first isolation space and a processor resource, the first isolation space is used to run the operating system and a secure processing program, and store to-be-processed data, the secure processing program corresponds to a program in the virtual instance, and is used to process the to-be-processed data, to implement a secure processing function of the program in the virtual instance, and the first isolation space is isolated from the program running environment.

When the host switches to the secure mode, the first isolation environment corresponding to the virtual instance is established or allocated based on the task information; and the first isolation environment includes the operating system in the secure mode and the resource allocated to the first isolation environment, where the resource includes the first isolation space and the processor resource, the first isolation space is used to run the operating system and the secure processing program, and store the to-be-processed data, and the first isolation space is isolated from the program running environment, so that the first isolation environment is a relatively secure environment. Therefore, in the first isolation environment corresponding to the virtual instance, the secure processing program is run, and the secure processing program is used to process the to-be-processed data, thereby improving data processing security.

In a possible implementation, the task information sent by a security monitor is received, where the task information is information obtained by the security monitor in the non-secure mode. A security level of the security monitor is relatively high, and the security monitor transfers the task information in the program running environment in the non-secure mode to the first isolation environment in the secure mode, so that security of transferring the task information can be improved.

In another possible implementation, the first isolation space is an isolation running environment that is used only to communicate with the virtual instance corresponding to the first isolation space, and cannot be accessed by another virtual instance.

In another possible implementation, the task information further includes an address of a shared memory. First data is obtained based on the address of the shared memory, where the first data includes the secure processing program and the to-be-processed data, and the shared memory is a memory shared by the program running environment and the first isolation environment. Because the shared memory is a memory shared by the program running environment and the first isolation environment, the first data in the program running environment in the non-secure mode may be transferred to the first isolation environment in the secure mode by using the shared memory, to ensure that the first isolation environment can be created based on the first data.

In another possible implementation, the host further includes a second isolation environment, and the second isolation environment includes the first isolation environment. In this way, the isolation environment may be divided into two layers: the first isolation environment and the second isolation environment. In the second isolation environment, first isolation environments corresponding to different virtual instances may be created, and the first isolation environments corresponding to the different virtual instances may be managed, to implement management by using the virtual instance as a granularity, thereby implementing refined management.

In another possible implementation, an amount of resources included in the first isolation environment corresponding to the virtual instance that runs in the program running environment is adjusted. In this way, it can be ensured that the amount of resources included in the first isolation environment meets a requirement of running the program processing program to process the to-be-processed data.

In another possible implementation, the first isolation environment corresponding to the virtual instance that runs in the program running environment is released. In this way, an idle resource may be released for use by another virtual instance.

In another possible implementation, the operating system in the secure mode in the first isolation space is run, and the secure processing program is run by using the operating system to process the to-be-processed data, to obtain a processing result. In this way, the secure processing program may be run by using the operating system in the first isolation environment to process the to-be-processed data, to ensure that the secure processing program may be run in the first isolation environment, and a one-to-one correspondence between the virtual instance and the first isolation environment can be implemented.

In another possible implementation, the processing result is transmitted to the program running environment, and switching of a working mode of the host to the non-secure mode is triggered. This ensures that the virtual instance located in the program running environment can obtain the processing result.

In another possible implementation, second data is obtained, where the second data includes status information and data stored in the first isolation space, the status information is used to describe a running status of the operating system in the first isolation environment and a running status of the secure processing program, and the second data is used to restore the first isolation environment corresponding to the virtual instance on another host. In this way, the virtual instance can be migrated to the other host, the virtual instance can continue to be run on the other host, and the secure processing program continues to process the to-be-processed data in the first isolation environment, thereby implementing decoupling between the first isolation environment and hardware of the host.

In another possible implementation, the second data is sent to the other host, to restore the first isolation environment corresponding to the virtual instance on the other host. In this way, the virtual instance can be migrated to the other host, the virtual instance can continue to be run on the other host, and the secure processing program continues to process the to-be-processed data in the first isolation environment, thereby implementing decoupling between the first isolation environment and hardware of the host.

In another possible implementation, the host may include a plurality of first isolation environments, and each of the plurality of first isolation environments is in a one-to-one correspondence with a virtual instance in the program running environment. In this way, different virtual instances correspond to different first isolation environments, so that management is performed by using a virtual instance as a granularity, thereby implementing refined management.

According to a third aspect, this application provides a data processing apparatus, configured to perform the method in any one of the second aspect or the possible implementations of the second aspect. Specifically, the apparatus includes units configured to perform the method in any one of the second aspect or the possible implementations of the second aspect.

According to a fourth aspect, this application provides a data processing apparatus, where the apparatus includes a transceiver, a processor, and a memory. The transceiver, the processor, and the memory may be connected via an internal connection. The memory is configured to store a program, instructions, or code. The processor is configured to execute the program, the instructions, or the code in the memory and cooperate with the transceiver, so that the apparatus completes the instructions of the method in any one of the second aspect or the possible implementations of the second aspect.

According to a fifth aspect, this application provides a computer program product, where the computer program product includes a computer program stored in a computer-readable storage medium, and the computer program is loaded by a processor to implement instructions of the method in the second aspect or any possible implementation of the second aspect.

According to a sixth aspect, an embodiment of this application provides a computer-readable storage medium, configured to store a computer program. The computer program is loaded by a processor to execute instructions of the method in any one of the second aspect or the possible implementations of the second aspect.

DESCRIPTION OF EMBODIMENTS

The following further describes in detail implementations of this application with reference to accompanying drawings.

Figure 1:
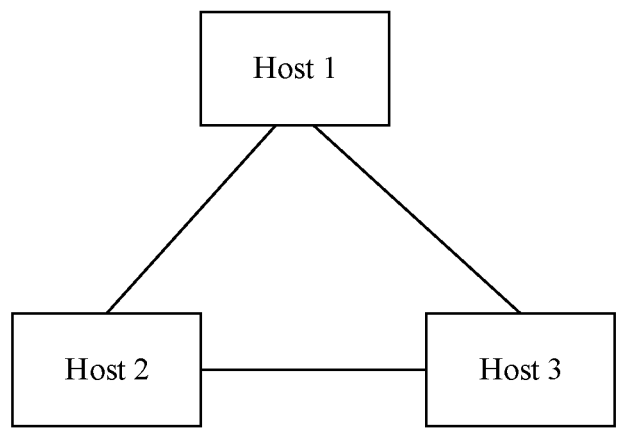
FIG. 1 is a schematic diagram of a system architecture according to an embodiment of this application.

Refer to FIG. 1. An embodiment of this application provides a system architecture. The system architecture includes at least one host. For any two of the at least one host, a network connection may be established between the two hosts.

The system architecture may be applied to a scenario such as a cloud scenario or a data center. For example, a host in the system architecture may be a server included in a cloud scenario or a server included in a data center.

For each of the at least one host, the host may include at least one virtual instance, and the host may provide a running environment for the at least one virtual instance, so that each virtual instance can run in the environment.

The at least one virtual instance includes a virtual machine, a container, and/or the like.

For each virtual instance, the virtual instance includes an operating system and a program, and the program may provide a service. The operating system may be run in the virtual instance, and the program is run by using the operating system, so that the virtual instance can provide the service.

For each virtual instance in the at least one virtual instance, the virtual instance may invoke a secure processing program to process data during running, to implement a secure processing function of the program.

The security processing program needs to run in an environment with relatively high security, to ensure security of data processing, and therefore implement the secure processing function. The secure processing function is a sub-function of a function that needs to be implemented by the program. Alternatively, an operation implemented by the secure processing program is one or more steps included in a function that needs to be implemented by the program.

For example, a program in the virtual instance is used to implement user login. In a user login process, the virtual instance may need to verify a password entered by a user in a running process. In this case, the virtual instance invokes a secure processing program used to implement password verification to verify the password entered by the user. Alternatively, a program in the virtual instance is a financial program, and a transfer needs to be performed in a running process of the virtual instance. In this case, the virtual instance invokes a secure processing program used to implement a transfer to perform the transfer. Data that needs to be processed by the secure processing program includes a transfer amount, input account information, output account information, and the like.

In the foregoing two examples, to ensure security for password verification or security for the transfer, the secure processing program needs to be run in an environment with relatively high security, and the security processing program is used to process data.

Figure 2:
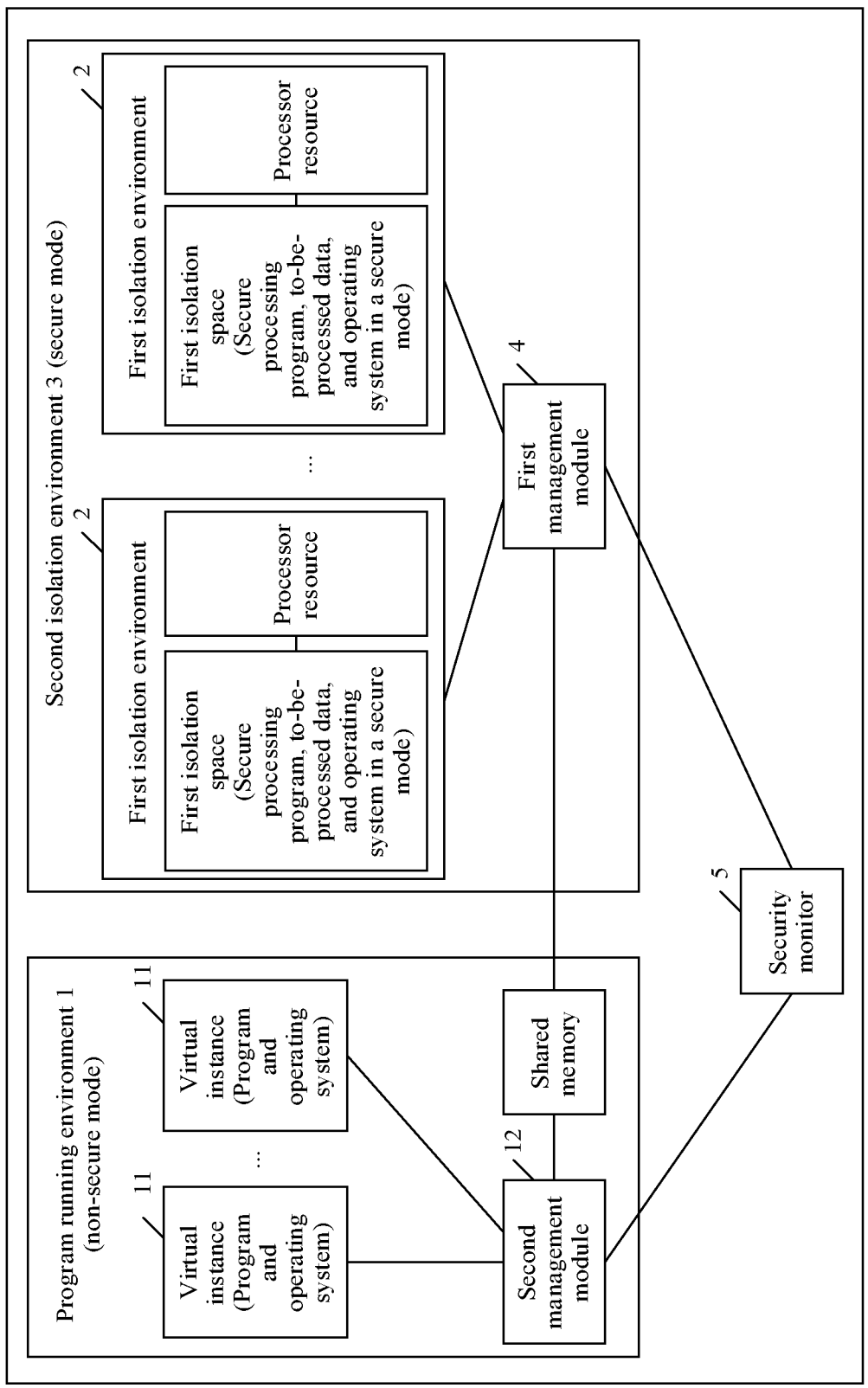
FIG. 2 is a schematic diagram of a structure of a host according to an embodiment of this application.

To meet this requirement, an embodiment of this application provides a host shown in FIG. 2. The host includes:

a program running environment 1 and a first isolation environment 2, where the program running environment 1 is an environment in which the host operates in a non-secure mode, and the first isolation environment 2 is an environment in which the host operates in a secure mode.

The program running environment 1 includes at least one virtual instance operating in the non-secure mode, and the first isolation environment 2 corresponds to a virtual instance 11 in the program running environment 1.

The first isolation environment 2 includes an operating system in a secure mode and a resource allocated to the first isolation environment 2. The resource includes a first isolation space and a processor resource. The first isolation space is used to run the operating system and a secure processing program, and store to-be-processed data. The secure processing program corresponds to a program in the virtual instance 11, and is used to process the to-be-processed data, to implement a secure processing function of the program in the virtual instance 11. The first isolation space is isolated from the program running environment 1.

The program running environment 1 is used to provide a hardware resource and/or a software resource required for running the virtual instance, and the first isolation environment 1 is used to provide a hardware resource and/or a software resource required for running the secure processing program.

There is an association relationship between the secure processing program and the program in the virtual instance 11. For example, the secure processing program is a program invoked by the program in the virtual instance 11. A function implemented by the secure processing program is a sub-function of a function implemented by the program in the virtual instance 11. Alternatively, a function implemented by the secure processing program is one or more steps of a function implemented by the program in the virtual instance 11.

The operating system in the secure mode that is included in the first isolation environment 2 corresponds to the secure processing program. For example, the operating system is an operating system corresponding to a program type of the secure processing program. The operating system may be configured to process a type of program, and the program type of the secure processing program corresponds to the operating system, so that the operating system can run the secure processing program. For example, the operating system may be configured to process a program of a windows (windows) type, that is, a program type of the secure processing program is windows.

The processor resource includes a time slice of occupying a processor of the host, and/or an input/output (input/output, I/O) interface, and the like. The time slice is a period of time, and indicates that the processor of the host is configured to: during the period of time, run the operating system and the secure processing program in the first isolation space and process the to-be-processed data.

The first isolation space is a space protected by the host in the secure mode. The first isolation space is isolated from the program running environment 1, so that a virtual instance other than the virtual instance 11 in the program running environment 1 cannot communicate with the first isolation space.

An operating system included in the virtual instance 11 is different from the operating system in the secure mode. The operating system included in the virtual instance 11 runs in the program running environment 1, and the operating system in the secure mode can run only in the first isolation environment 2 corresponding to the virtual instance 11.

Optionally, the host may include a plurality of first isolation environments 2, and each of the plurality of first isolation environments 2 is in a one-to-one correspondence with a virtual instance in the program running environment 1.

The non-secure mode and the secure mode are two different modes in which the host operates, that is, the host may operate in the non-secure mode or operate in the secure mode.

In the secure mode, the first isolation environment 2 corresponding to the virtual instance 11 is isolated from the program running environment 1. Virtual instances other than the virtual instance 11 that run in the program running environment 1 in the non-secure mode cannot communicate with the first isolation environment 2 corresponding to the virtual instance 11 in the secure mode. The first isolation environment 2 corresponding to the virtual instance 11 includes the secure processing program, the to-be-processed data required to run the secure processing program, and the operating system in the secure mode. Therefore, the secure processing program may be run in the first isolation environment 2 corresponding to the virtual instance 11 by using the operating system, and the to-be-processed data is processed by using the secure processing program. In this way, the secure processing program is run and the to-be-processed data is processed in an isolated and protected environment, thereby improving security of processing the to-be-processed data.

Optionally, refer to FIG. 2. The host further includes a second isolation environment 3, where the second isolation environment 3 is also an environment in which the host works in the secure mode. The second isolation environment 3 includes a first management module 4 and one or more first isolation environments 2, and the first management module 4 is configured to manage each first isolation environment 2. For example, the first management module 4 may be configured to establish each first isolation environment 2.

Each first isolation environment 2 is a subset of the second isolation environment 3. The second isolation environment 3 further includes a second isolation space, the second isolation space is also a space protected by the host in the secure mode, and the first isolation space included in each first isolation environment 2 is located in the second isolation space.

A storage space of the host is divided into two parts, one part is referred to as a user storage space, and the other part is referred to as a second isolation space. The user storage space belongs to the program running environment 1. Each virtual instance in the program running environment 1 may access the user storage space, but cannot access the second isolation space protected by the host.

Optionally, refer to FIG. 2. The program running environment 1 further includes a second management module 12, and the second management module 12 is configured to manage the program running environment 1. For example, the second management module 12 may be configured to manage each virtual instance in the program running environment 1.

Because the first management module 4 and the second management module 12 are located in different environments and operate in different modes respectively, that is, the first management module 4 is located in the second isolation environment 3 and operates in the secure mode, and the second management module 12 is located in the program running environment 1 and operates in the non-secure mode, the first management module 4 and the second management module 12 cannot directly communicate with each other, that is, information transfer cannot be directly performed between the first management module 4 and the second management module 12.

In order that information can be transferred between the first management module 4 and the second management module 12, the host further includes a security monitor 5, and a security level of the security monitor 5 in the host is relatively high, and is higher than a specified level. Information is transferred between the first management module 4 and the second management module 12 by using the security monitor 5.

A process of transferring information by using the security monitor 5 may be as follows:

When the host operates in the secure mode, the first management module 4 inputs information that needs to be transferred to the second management module 12 to the security monitor 5, and the security monitor 5 triggers the host to switch to the non-secure mode, and sends the information to the second management module 12. When the host switches to the non-secure mode, the second management module 12 receives the information.

Alternatively, when the host works in the non-secure mode, the second management module 12 inputs information that needs to be transferred to the first management module 4 to the security monitor 5, and the security monitor 5 triggers the host to switch to the secure mode, and sends the information to the first management module 4. When the host switches to the secure mode, the first management module 4 receives the information.

Because the security level of the security monitor 5 is relatively high, and generally the security level of the security monitor 5 in the host may be the highest, it is ensured that security of information transfer between the first management module 4 and the second management module 12 is also relatively high.

For the first isolation environment 2 corresponding to the virtual instance 11, in this embodiment of this application, the first isolation environment 2 corresponding to the virtual instance 11 may be established in the second isolation environment 3 in the following two manners. The two manners are respectively as follows:

In a first manner, when the virtual instance 11 invokes the secure processing program, the first isolation environment 2 corresponding to the virtual instance 11 is established in the second isolation environment 3.

In the first manner, the host first operates in the non-secure mode, and when the virtual instance 11 located in the program running environment 1 needs to invoke the secure processing program, the virtual instance 11 sends an invoking request to the second management module 12.

The second management module 12 is configured to: receive the invoking request; generate task information, where the task information includes an identity of the virtual instance 11; and input the task information to the security monitor 5 of the host.

The security monitor 5 is configured to: receive the task information, trigger the host to switch to the secure mode, and send the task information to the first management module 4.

The first management module 4 is configured to: when the host switches to the secure mode, receive the task information, and establish, based on the task information, the first isolation environment 2 corresponding to the virtual instance 11.

In the first manner, the invoking request may include a program identity of the secure processing program and to-be-processed data, and the to-be-processed data is data required for running the secure processing program. For example, it is assumed that the secure processing program is a program for implementing a transfer function, and the to-be-processed data includes a transfer amount, account information of a transferor, account information of a transferee, and the like.

The second management module 12 is further configured to: after receiving the invoking request, obtain the secure processing program based on the program identity of the secure processing program, and store first data in a shared memory, where the first data includes the secure processing program and the to-be-processed data.

The task information input by the second management module 12 to the security monitor 5 further includes an address of the shared memory and an amount of resources.

Optionally, the resource quantity is a capacity of the first isolation space. The task information may further include a data volume of the first data.

Optionally, the first data is a data packet, and a packet header of the data packet may include a data volume of the first data.

The first management module 4 is further configured to: obtain the first data from the shared memory based on the task information, and establish the first isolation environment 2 corresponding to the virtual instance based on the first data.

The first management module 4 obtains the first data from the shared memory based on the address of the shared memory that is included in the task information. In a case in which the first data includes the data volume of the first data, the first management module 4 obtains the data volume of the first data from the packet header of the first data in the shared memory based on the address of the shared memory, and obtains the first data from the shared memory based on the data volume. Alternatively, when the task information includes the data volume of the first data, the first management module 4 obtains the first data from the shared memory based on the address of the shared memory and the data volume.

For the first manner, the following describes a complete process of establishing the first isolation environment 2 in detail. The complete process includes the following operations (1-1) to (1-5), which may be as follows:

(1-1): The second management module 12 receives the invoking request, where the invoking request includes the program identity of the secure processing program and the to-be-processed data.

(1-2): The second management module 12 obtains the secure processing program based on the program identity of the secure processing program, verifies the secure processing program and the to-be-processed data to obtain verification information, and encrypts to-be-encrypted data by using first private key information corresponding to the virtual instance 11, to obtain the first data, where the to-be-encrypted data includes the secure processing program, the to-be-processed data, and the verification information.

Optionally, the second management module 12 further obtains the operating system in the secure mode based on a program type of the secure processing program invoked by the virtual instance 11, where the to-be-encrypted data further includes the operating system. The following lists an implementation of obtaining the operating system. The implementation is as follows:

A correspondence between a program type and an operating system is stored in the program running environment 1. Each record of the correspondence includes one program type and an operating system in the secure mode. Therefore, the second management module 12 obtains the operating system in the secure mode from the correspondence between the program type and the operating system based on the program type of the secure processing program invoked by the virtual instance 11.

Optionally, the verification information may be a hash value obtained by performing a hash operation on the secure processing program and the to-be-processed data.

Optionally, a correspondence between an identity of a virtual instance and first private key information may be stored in the program running environment 1, and each record of the correspondence includes an identity of one virtual instance and first private key information corresponding to the virtual instance. Therefore, an operation of obtaining the first private key information corresponding to the virtual instance 11 by the second management module 12 may be as follows:

The second management module 12 obtains the first private key information corresponding to the virtual instance 11 from the correspondence between the identity of the virtual instance and the first private key information based on the identity of the virtual instance 11.

(1-3): The second management module 12 allocates the shared memory in the user storage space included in the program running environment 1, where a capacity of the shared memory is greater than the data volume of the first data; stores the first data in the shared memory; generates the task information, where the task information includes information such as the identity of the virtual instance 11 and the address of the shared memory; and inputs the task information to the security monitor 5 of the host.

(1-4): The security monitor 5 receives the task information, triggers the host to switch to the secure mode, and send the task information to the first management module 4.

(1-5): When the host switches to the secure mode, the first management module 4 receives the task information; obtains the operating system in the secure mode, the secure processing program invoked by the virtual instance 11, and the to-be-processed data based on the task information; allocates a resource, where the resource includes the first isolation space and the processor resource; and stores the operating system, the secure processing program, and the to-be-processed data in the first isolation space, to obtain the first isolation environment 2 corresponding to the virtual instance 11.

For the secure processing program and the to-be-processed data, the following lists an implementation instance in which the first management module 4 obtains the secure processing program and the to-be-processed data. The implementation instance may be as follows:

The first management module 4 obtains first public key information corresponding to the virtual instance 11 based on the identity of the virtual instance 11 included in the task information; obtains the first data from the shared memory based on the address of the shared memory included in the task information, decrypts the first data by using the first public key information corresponding to the virtual instance 11, to obtain the secure processing program, the to-be-processed data, and the verification information; and verifies the secure processing program and the to-be-processed data by using the verification information. If the verification succeeds, the first management module 4 obtains the secure processing program invoked by the virtual instance 11 and the to-be-processed data. If the verification fails, the running is ended. Alternatively, the first management module 4 notifies the second management module 12 by using the security monitor 5, so that the second management module 12 restores the first data in the shared memory.

For the verification information, when the verification information is a hash value, a verification process of the first management module 4 may be as follows:

The first management module 4 calculates a hash value based on the secure processing program and the to-be-processed data obtained through decryption. If the calculated hash value is the same as the verification information, the verification succeeds; or if the calculated hash value is different from the verification information, the verification fails.

The first private key information corresponding to the virtual instance 11 and the first public key information corresponding to the virtual instance 11 are a pair of public and private keys. An operation of obtaining the first public key information by the first management module 4 may be as follows:

A correspondence between an identity of a virtual instance and first public key information may be stored in the second isolation environment 3, and each record of the correspondence includes an identity of one virtual instance and first public key information corresponding to the virtual instance. The first management module 4 obtains the first public key information corresponding to the virtual instance 11 from the correspondence between the identity of the virtual instance and the first public key information based on the identity of the virtual instance 11.

For the operating system in the secure mode, the first management module 4 may obtain the operating system in the following two manners. The two manners are as follows:

Manner 1: The first data includes the operating system. Therefore, the first management module 4 decrypts the first data to obtain the operating system.

Manner 2: A correspondence between a program type and an operating system is stored in the second isolation environment 3. Each record of the correspondence includes one program type and an operating system in the secure mode. Therefore, the first management module 4 obtains the corresponding operating system from the correspondence between the program type and the operating system based on the program type of the secure processing program invoked by the virtual instance.

In the second manner, at least one first isolation environment 2 is established in the second isolation environment 3 in advance. In this way, for the virtual instance 11 in the program running environment 1, when the virtual instance 11 invokes the secure processing program, the first isolation environment 2 may be allocated to the virtual instance 11 in the second isolation environment 3.

In the second manner, for each first isolation environment in the at least one first isolation environment 2, the first isolation environment includes an operating system in the secure mode and a resource allocated to the first isolation environment, the resource includes a first isolation space, and the first isolation space is used to store the operating system.

For the operating system in the secure mode, there may be one or more first isolation environments 2 including the operating system. When there are a plurality of first isolation environments 2, capacities of first isolation spaces included in the plurality of first isolation environments 2 are different. For example, for a specific operating system, three first isolation environments 2 including the operating system may be established in advance, and capacities of first isolation spaces included in the three first isolation environments 2 are respectively 10G, 8G, and 6G.

The second isolation environment 3 includes operating systems corresponding to different program types. For each operating system, one or more first isolation environments 2 including the operating system may be established.

In the second manner, when the host operates in the non-secure mode, when the virtual instance 11 in the program running environment 1 invokes the secure processing program to process the to-be-processed data, a first isolation environment 2 needs to be allocated to the virtual instance 11 in the second isolation environment 3. The allocation process includes operations (2-1) to (2-5), which may be as follows:

(2-1): When the virtual instance 11 needs to invoke the secure processing program, the virtual instance 11 sends the invoking request to the second management module 12, where the invoking request includes the program identity of the secure processing program and the to-be-processed data.

(2-2): The second management module 12 receives the invoking request; establishes the shared memory in a program running space included in the program running environment 1; stores the first data in the shared memory, where the first data includes the secure processing program and the to-be-processed data; generates the task information, where the task information includes the identity of the virtual instance, the address of the shared memory, and the capacity of first isolation space; and inputs the task information to the security monitor 5 of the host.

For the first data, an operation of obtaining the first data by the second management module 12 may be as follows:

The second management module 12 may verify the secure processing program and the to-be-processed data to obtain the verification information, obtain the first private key information corresponding to the virtual instance 11, and encrypt the to-be-encrypted data by using the first private key information, to obtain the first data. The to-be-encrypted data includes the program identity of the security processing program, the to-be-processed data, and the verification information.

(2-3): The security monitor 5 receives the task information, triggers the host to switch to the secure mode, and send the task information to the first management module 4.

(2-4): When the host switches to the secure mode, the first management module 4 reads the task information from the security monitor 5, and obtains the secure processing program and the to-be-processed data from the shared memory based on the address of the shared memory included in the task information.

Optionally, after obtaining the first data from the shared memory, the first management module 12 obtains the first public key information corresponding to the virtual instance 11 based on the identity of the virtual instance 11, decrypts the first data by using the first public key information to obtain the secure processing program, the to-be-processed data, and the verification information, and verifies the to-beprocessed data and the secure processing program based on the verification information, and if the verification succeeds, performs the following operation (2-5).

(2-5): The first management module 4 allocates, based on the capacity of the first isolation space and the program type of the secure processing program that are included in the task information, the first isolation environment 2 that is established in advance, stores the secure processing program and the to-be-processed data in a first isolation space included in the first isolation environment 2, and allocates the processor resource to the first isolation environment 2.

A capacity of the allocated first isolation space included in the first isolation environment 2 is greater than or equal to a capacity of the first isolation space included in the task information. After the operation (2-5) is performed, the first isolation environment 2 includes the first isolation space and the processor resource, and the first isolation space stores the operating system in the secure mode, the security processing program, and to-be-processed data.

In the first manner and the second manner, the first management module 4 may establish first isolation environments 2 corresponding to different virtual instances, to establish different first isolation environments for different virtual instances, thereby achieving more refined management.

The first management module 4 is further configured to run the operating system in the first isolation environment 2 corresponding to the virtual instance 11, and run the secure processing program by using the operating system to process the to-be-processed data.

Optionally, the first management module 4 may process the to-be-processed data by performing the following operations (3-1) to (3-3). The operations (3-1) to (3-3) are as follows:

(3-1): The first management module 4 runs the operating system in the first isolation space 2 corresponding to the virtual instance 11.

Optionally, in the first isolation space 2, the operating system is started. After the operating system is started, a processor of the host may start to run the operating system.

(3-2): The first management module 4 starts, by using the operating system, a process used to run the secure processing program.

After the operating system is run, the operating system may establish the process used to run the secure processing program.

(3-3): The process is used to process the to-be-processed data, to obtain a processing result.

The processor of the host may invoke the process, and run the process. When running the process, the processor processes the to-be-processed data to obtain the processing result.

Optionally, in the foregoing process of processing the to-be-processed data, the first management module 4 is further configured to adjust an amount of resources included in the first isolation environment 2 corresponding to the virtual instance 11.

The amount of resources may include the capacity of the first isolation space. That is, in the process of processing the to-be-processed data, the first management module 4 increases or decreases the capacity of the first isolation space based on a requirement.

Optionally, after processing the to-be-processed data is completed, the first management module 4 is further configured to release the first isolation environment 2 corresponding to the virtual instance 11.

After processing the to-be-processed data is completed and the processing result is obtained, the first management module 4 is further configured to transmit the processing result to the program running environment 2, and trigger switching of the working mode of the host to the non-secure mode.

In this way, when the host switches to the non-secure mode, the second management module 12 is further configured to obtain the processing result, and input the processing result into the virtual instance 11.

Next, a complete process of inputting the processing result to the virtual instance 11 is described in detail. The complete process includes the following operations (4-1) to (4-3), which may be as follows:

(4-1): The first management module 4 obtains second private key information corresponding to the virtual instance 11, encrypts the processing result by using the second private key information, stores the encrypted processing result to the shared memory, and inputs task completion information to the security monitor 5, where the task completion information includes the identity of the virtual instance 11, the address of the shared memory, and a task completion indication.

An operation of obtaining the second private key information by the first management module 4 may be as follows:

A correspondence between an identity of a virtual instance and second private key information may be stored in the second isolation environment 3, and each record of the correspondence includes an identity of one virtual instance and the second private key information corresponding to the virtual instance. The first management module 4 obtains the second private key information corresponding to the virtual instance 11 from the correspondence between the identity of the virtual instance and the second private key information based on the identity of the virtual instance 11.

(4-2): The security monitor 5 receives the task completion information, triggers the host to switch the working mode to the non-secure mode, and transmits the task completion information to the second management module 12.

(4-3): When the host switches to the non-secure mode, the second management module 12 receives the task completion information, where the task completion information includes the identity of the virtual instance 11, the address of the shared memory, and the task completion indication; and under triggering of the task completion indication, obtains second public key information corresponding to the virtual instance 11 based on the identity of the virtual instance, obtains the encrypted processing result based on the address of the shared memory, and decrypts the encrypted processing result by using the second public key information, to obtain the processing result, and inputs the processing result to the virtual instance 11.

The second private key information corresponding to the virtual instance 11 and the second public key information corresponding to the virtual instance 11 are a pair of public and private keys. An operation of obtaining the second public key information by the second management module 12 may be as follows:

The correspondence between an identity of a virtual instance and second public key information may be stored in the program running environment 1, and each record of the correspondence includes an identity of one virtual instance and second public key information corresponding to the virtual instance. The second management module 12 obtains the second public key information corresponding to the virtual instance 11 from the correspondence between the identity of the virtual instance and the second public key information based on the identity of the virtual instance.

Optionally, in the first isolation environment 2 corresponding to the virtual instance 11, in a process of processing the to-be-processed data by using the secure processing program, the virtual instance 11 may be migrated from the host to another host. When the virtual instance 11 is migrated to the other host, the first isolation environment 2 corresponding to the virtual instance 11 also needs to be migrated to the other host. During implementation, the first management module 4 is further configured to: obtain second data, and input the second data to the second management module 12, where the second data includes status information and data stored in the first isolation space 2, and the status information is used to describe a running status of the operating system and a running status of the secure processing program.

The second management module 12 is further configured to send the second data to the other host. In this way, the other host receives the second data, and restores, based on the second data, the first isolation environment 2 corresponding to the virtual instance 11.

Optionally, the status information includes the current running status of the operating system and the current running status of the secure processing program. The data stored in the first isolation space includes content such as the operating program, the secure processing program, and an intermediate result of processing the to-be-processed data by the operating system.

Next, an implementation instance of inputting the second data to the second management module 12 is listed, and the implementation instance may be as follows:

After obtaining the second data, the first management module 4 stores the second data in the shared memory, and inputs migration information to the security monitor 5. The migration information includes the identity of the virtual instance 11, the address of the shared memory, and a migration indication.

The security monitor 5 receives the migration information, triggers the host to switch the working mode to the non-secure mode, and transmits the migration information to the second management module 12.

When the host switches to the non-secure mode, the second management module 12 receives the migration information, and under triggering of the migration indication, obtains the second data based on the address of the shared memory.

Same as the host provided in this embodiment of this application, the other host also includes a program running environment and a second isolation environment. The second management module located in the program running environment receives the second data, allocates a shared memory in a user storage space of the program running environment, stores the second data in the shared memory, and inputs recovery information to a security monitor of the other host, where the recovery information includes the address of the shared memory and a recovery indication.

The security monitor receives the recovery information, triggers the other host to switch a working mode to the secure mode, and transmits the recovery information to a first management module in the second isolation environment.

After the other host switches to the secure mode, the first management module located in the second isolation environment receives the recovery information, reads, under triggering of the recovery indication, the second data from the shared memory based on the address of the shared memory, and recovers the first isolation environment corresponding to the virtual instance 11 based on the second data.

Optionally, the first management module 4 is a virtualization management program (Hypervisor), and the second management module 12 is also a hypervisor.

In this embodiment of this application, because the host includes the program running environment and the first isolation environment, for the virtual instance included in the program running environment that operates in the non-secure mode, the first isolation environment corresponding to the virtual instance includes the operating system in the secure mode and the resource, the resource includes the first isolation space and the processor resource, the first isolation space is used to run the operating system and the secure processing program, and process the to-be-processed data, the secure processing program is a program invoked by the virtual instance, the to-be-processed data is data required for running the secure processing program, and the first isolation space is a space protected by the host in the secure mode. In this way, in the first isolation environment corresponding to the virtual instance 11, the secure processing program is run, and the secure processing program is used to process the to-be-processed data, thereby improving data processing security.

Figure 3:
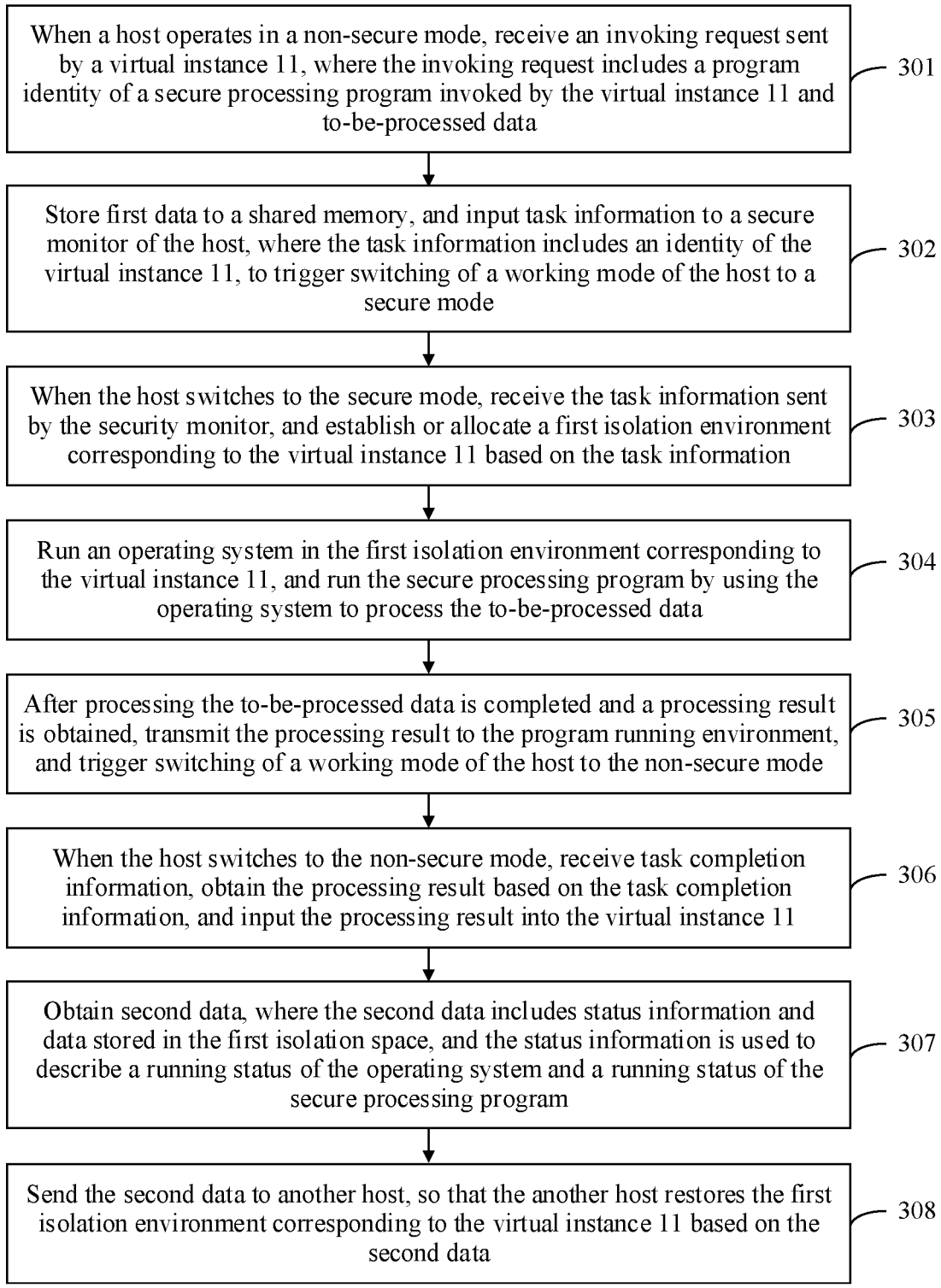
FIG. 3 is a flowchart of a data processing method according to an embodiment of this application.

Refer to FIG. 3. This application provides a data processing method. The method may be applied to the host shown in FIG. 2. The method includes the following steps.

Step 301: When the host operates in a non-secure mode, receive an invoking request sent by a virtual instance 11, where the invoking request includes a program identity of a secure processing program invoked by the virtual instance 11 and to-be-processed data.

The host includes a program running environment and a second isolation environment, the program running environment includes at least one virtual instance, and the virtual instance 11 is any virtual instance in the at least one virtual instance.

Figure 4:
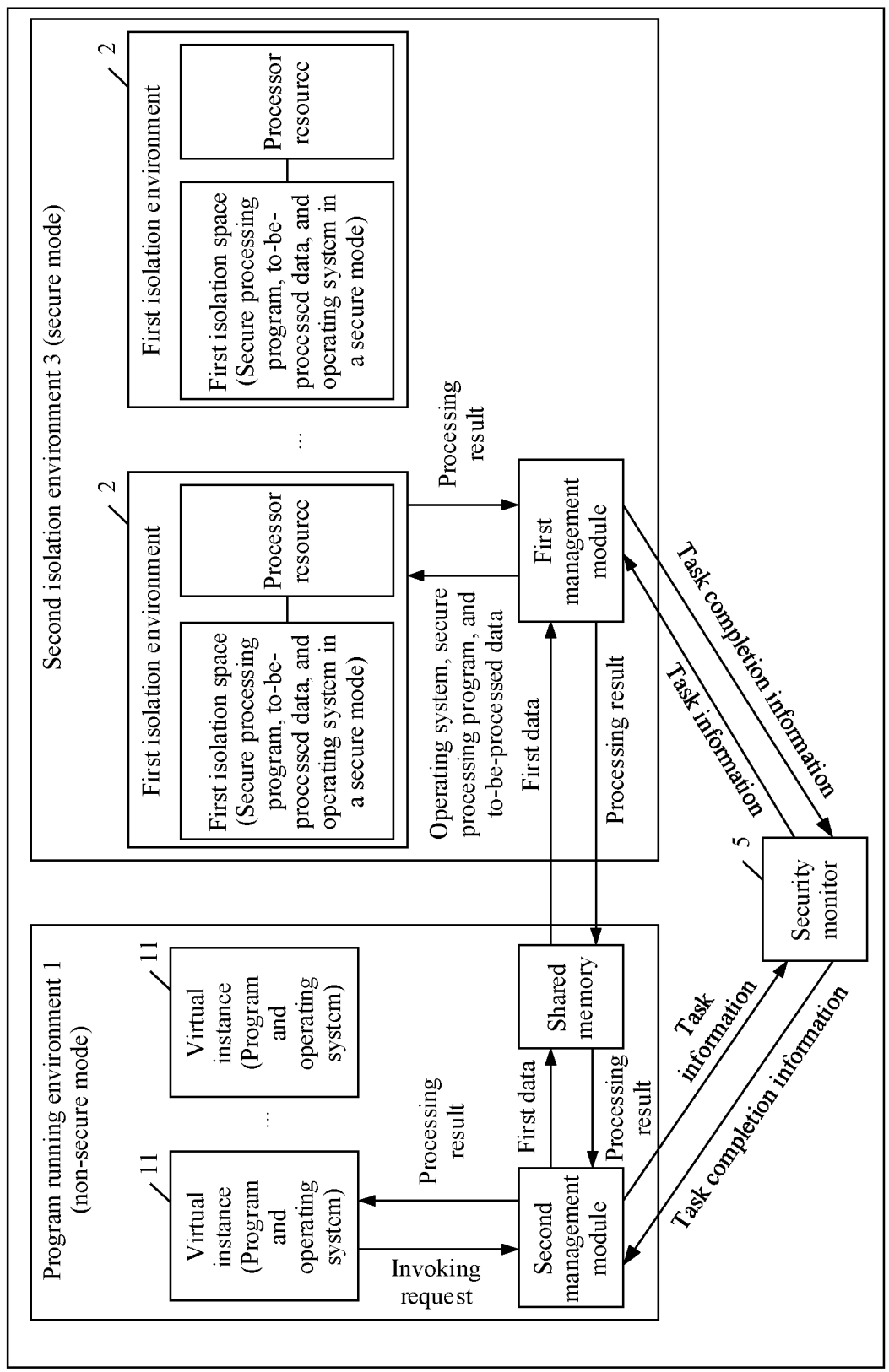
FIG. 4 is a schematic diagram of information transfer between modules in a host according to an embodiment of this application.

Refer to FIG. 4. A second management module receives the invoking request sent by the virtual instance 11.

Step 302: Store first data to a shared memory, and input task information to a secure monitor of the host, where the task information includes an identity of the virtual instance 11, to trigger switching of a working mode of the host to a secure mode.

Refer to FIG. 4. The second management module stores the first data in the shared memory, and inputs the task information to the security monitor of the host.

In this step, the secure processing program is obtained based on the program identity of the secure processing program, verification is performed on the secure processing program and the to-be-processed data to obtain verification information, and to-be-encrypted data is encrypted by using first private key information corresponding to the virtual instance 11, to obtain the first data, where the to-be-encrypted data includes the secure processing program, the to-be-processed data, and the verification information. The shared memory in a user storage space included in the program running environment is allocated based on a data volume of the first data, where a capacity of the shared memory is greater than a data volume of the first data. The first data is stored in the shared memory. Task information is generated, where the task information includes the identity of the virtual instance 11 and an address of the shared memory. The task information is input to the security monitor of the host.

Optionally, the task information further includes information such as a capacity of a first isolation space.

Optionally, the to-be-encrypted data further includes an operating system in the secure mode. In other words, before the to-be-encrypted data is encrypted, the operating system in the secure mode is further obtained based on a program type of the secure processing program.

The operation of obtaining the operating system may be as follows:

A correspondence between a program type and an operating system is stored in the program running environment of the host. Each record of the correspondence includes one program type and an operating system of the type in the secure mode. Therefore, the operating system in the secure mode is obtained from the correspondence between the program type and the operating system based on the program type of the secure processing program.

Optionally, the verification information may be a hash value obtained by performing a hash operation on the secure processing program and the to-be-processed data.

Optionally, a correspondence between an identity of a virtual instance 11 and first private key information may be stored in the program running environment, and each record of the correspondence includes an identity of one virtual instance and first private key information corresponding to the virtual instance. Therefore, an operation of obtaining the first private key information corresponding to the virtual instance 11 may be as follows:

The first private key information corresponding to the virtual instance 11 is obtained from the correspondence between the identity of the virtual instance and the first private key information based on the identity of the virtual instance 11.

The security monitor of the host receives the task information, triggers the host to switch to the security mode, and the security monitor sends the task information.

Step 303: When the host switches to the secure mode, receive the task information sent by the security monitor, and establish or allocate a first isolation environment corresponding to the virtual instance 11 based on the task information.

Refer to FIG. 4. The first management module receives the task information, obtains the first data from the shared memory based on the task information, and establish or allocate the first isolation environment corresponding to the virtual instance 11 based on the first data.

In a case in which the first isolation environment corresponding to the virtual instance 11 in the program running environment is not pre-established in the second isolation environment, an operation of step 303 may be as follows:

When the host switches to the secure mode, the task information is received. First public key information corresponding to the virtual instance 11 is obtained based on the identity of the virtual instance 11 included in the task information. The first data is obtained from the shared memory based on the address of the shared memory included in the task information. The first data is decrypted by using the first public key information corresponding to the virtual instance 11, to obtain the secure processing program, the to-be-processed data, and the verification information. Verification is performed on the secure processing program and the to-be-processed data by using the verification information. If the verification succeeds, the secure processing program invoked by the virtual instance 11 and the to-be-processed data are obtained. An operating system corresponding to a program type of the secure processing program in the secure mode is obtained. The first isolation space and a processor resource are allocated, where the first isolation space includes the secure processing program, the to-be-processed data, and the operating system, to establish the first isolation environment corresponding to the virtual instance 11.

For the verification information, when the verification information is a hash value, a verification process may be as follows:

A hash value is calculated based on the secure processing program and the to-be-processed data obtained through decryption. If the hash value obtained through calculation is the same as the verification information, the verification succeeds. Alternatively, if the hash value obtained through calculation is different from the verification information, the verification fails.

The first private key information corresponding to the virtual instance 11 and the first public key information corresponding to the virtual instance 11 are a pair of public and private keys. An operation of obtaining the first public key information may be as follows:

A correspondence between an identity of a virtual instance and first public key information may be stored in the second isolation environment, and each record of the correspondence includes an identity of one virtual instance and first public key information corresponding to the virtual instance. Therefore, the first public key information corresponding to the virtual instance 11 may be obtained from the correspondence between the identity of the virtual instance and the first public key information based on the identity of the virtual instance 11.

For the operating system, the operating system may be obtained in the following two manners. The two manners are as follows:

Manner 1: The first data includes the operating system. Therefore, the first data is decrypted to obtain the operating system.

Manner 2: A correspondence between a program type and an operating system is stored in the second isolation environment. Each record of the correspondence includes one program type and an operating system of the type in the secure mode. Therefore, the corresponding operating system is obtained from the correspondence between the program type and the operating system based on the program type of the secure processing program.

In a case in which the first isolation environment corresponding to the virtual instance 11 is pre-established in the second isolation environment, an operation of step 303 may be as follows:

When the host switches to the secure mode, the task information is received. The first data is obtained from the shared memory based on the address of the shared memory included in the task information, where the first data includes the secure processing program, the to-be-processed data, and the capacity of the first isolation space. The pre-established first isolation environment is allocated based on the capacity of the first isolation space included in the task information and the program type of the secure processing program. The secure processing program and the to-be-processed data are stored in the first isolation space included in the first isolation environment. A processor resource is allocated to the first isolation environment.

Optionally, after the first data is obtained from the shared memory, the first public key information corresponding to the virtual instance 11 is obtained based on the identity of the virtual instance 11. The first data is decrypted by using the first public key information to obtain the secure processing program, the to-be-processed data, and the verification information. Verification is performed on the to-be-processed data and the secure processing program based on the verification information. If the verification succeeds, the to-be-processed data and the secure processing program are stored in the first isolation space included in the first isolation environment corresponding to the virtual instance 11.

Step 304: Run the operating system in the first isolation environment corresponding to the virtual instance 11, and run the secure processing program by using the operating system to process the to-be-processed data.

Optionally, the to-be-processed data is processed by performing the following operations 3041 to 3043. The operations 3041 to 3043 are as follows:

3041: Run the operating system in the secure mode in the first isolation space.

Optionally, in the first isolation space, the operating system is started. After the operating system is started, a processor of the host may start to run the operating system.

3042: Start, by using the operating system, a process used to run the secure processing program.

After the operating system is run, the operating system establishes the process used to run the secure processing program.

3043: Process the to-be-processed data by using the process, to obtain a processing result.

The processor of the host may invoke the process, and run the process. When running the process, the processor processes the to-be-processed data to obtain the processing result.

Optionally, in the foregoing process of processing the to-be-processed data, an amount of resources included in the first isolation environment corresponding to the virtual instance 11 may be adjusted.

The amount of resources may include the capacity of the first isolation space. That is, in the process of processing the to-be-processed data, the capacity of the first isolation space is increased or decreased based on a requirement.

Optionally, after processing the to-be-processed data is completed, the first isolation environment corresponding to the virtual instance 11 may be further released.

Step 305: After processing the to-be-processed data is completed and the processing result is obtained, transmit the processing result to the program running environment, and trigger switching of the working mode of the host to the non-secure mode.

In step 305, second private key information corresponding to the virtual instance 11 is obtained, the processing result is encrypted by using the second private key information, the encrypted processing result is stored to the shared memory, and task completion information is input to the security monitor, where the task completion information includes the identity of the virtual instance 11, the address of the shared memory, and a task completion indication.

Optionally, an operation of obtaining the second private key information may be as follows:

A correspondence between an identity of a virtual instance and second private key information may be stored in the second isolation environment, and each record of the correspondence includes an identity of one virtual instance and the second private key information corresponding to the virtual instance. The second private key information corresponding to the virtual instance 11 is obtained from the correspondence between the identity of the virtual instance and the second private key information based on the identity of the virtual instance 11.

The security monitor receives the task completion information, triggers the host to switch the working mode to the non-secure mode, and transmits the task completion information.

Step 306: When the host switches to the non-secure mode, receive the task completion information, obtain the processing result based on the task completion information, and input the processing result into the virtual instance 11.

Refer to FIG. 4. The second management module receives the task completion information, obtains the processing result from the shared memory based on the task completion information, and inputs the processing result into the virtual instance 11.

In step 306, when the host switches to the non-secure mode, the task completion information is received, where the task completion information includes the identity of the virtual instance 11, the address of the shared memory, and the task completion indication. Under triggering of the task completion indication, second public key information corresponding to the virtual instance 11 is obtained based on the identity of the virtual instance 11. The encrypted processing result is obtained based on the address of the shared memory. The encrypted processing result is decrypted by using the second public key information. The processing result is input to the virtual instance 11 based on the identity of the virtual instance 11.

The second private key information corresponding to the virtual instance 11 and the second public key information corresponding to the virtual instance are a pair of public and private keys.

The correspondence between an identity of a virtual instance and second public key information may be stored in the program running environment 1, and each record of the correspondence includes an identity of one virtual instance and second public key information corresponding to the virtual instance. Therefore, the second public key information corresponding to the virtual instance 11 may be obtained from the correspondence between the identity of the virtual instance and the second public key information based on the identity of the virtual instance 11.

Optionally, in the first isolation environment corresponding to the virtual instance 11, in a process of processing the to-be-processed data by using the secure processing program, the virtual instance 11 may be migrated from the host to another host. When the virtual instance 11 is migrated to the other host, the first isolation environment corresponding to the virtual instance 11 also needs to be migrated to the other host. This may be implemented by performing operations in the following steps 307 and 308.

Step 307: Obtain second data, where the second data includes status information and data stored in the first isolation space, and the status information is used to describe a running status of the operating system and a running status of the secure processing program.

Refer to FIG. 4. The first management module obtains the second data, stores the second data in the shared memory, and inputs migration information to the security monitor. The migration information includes the identity of the virtual instance 11, the address of the shared memory, and a migration indication. The security monitor receives the migration information, triggers switching of the working mode of the host to the non-secure mode, and transmits the migration information to the second management module. When the host switches to the non-secure mode, the second management module receives the migration information, and under triggering of the migration indication, obtains the second data based on the address of the shared memory.

Step 308: Send the second data to the other host, so that the other host restores the first isolation environment corresponding to the virtual instance 11 based on the second data.

Refer to FIG. 4. The second management module sends the second data to the other host. In this way, the other host receives the second data, and restores the first isolation environment corresponding to the virtual instance 11 based on the second data.

An operation of restoring the first isolation environment by the other host may be as follows:

The other host includes a program running environment and a second isolation environment. A second management module in the program running environment of the other host receives the second data, allocates a shared memory in a user storage space of the program running environment, stores the second data in the shared memory, and inputs recovery information to a security monitor of the other host, where the recovery information includes an address of the shared memory and a recovery indication. The security monitor receives the recovery information, triggers the other host to switch a working mode to the secure mode, and transmits the recovery information to a first management module in the second isolation environment. After the other host switches to the secure mode, the first management module in the second isolation environment of the other host receives the recovery information, reads, under triggering of the recovery indication, the second data from the shared memory based on the address of the shared memory, and recovers the first isolation environment corresponding to the virtual instance 11 based on the second data.

In this embodiment of this application, when the host switches to the secure mode, the host receives the task information and establishes the first isolation environment corresponding to the virtual instance 11, so that the host includes the program running environment and the first isolation environment. For the virtual instance 11 included in the program running environment that operates in the non-secure mode, the first isolation environment corresponding to the virtual instance 11 includes the operating system in the secure mode and the resource allocated to the first isolation environment, the resource includes the first isolation space and the processor resource, and the first isolation space is used to run the operating system and the secure processing program, and process the to-be-processed data. In this way, the to-be-processed data is processed in the first isolation environment, thereby improving security of processing the to-be-processed data.

Figure 5:
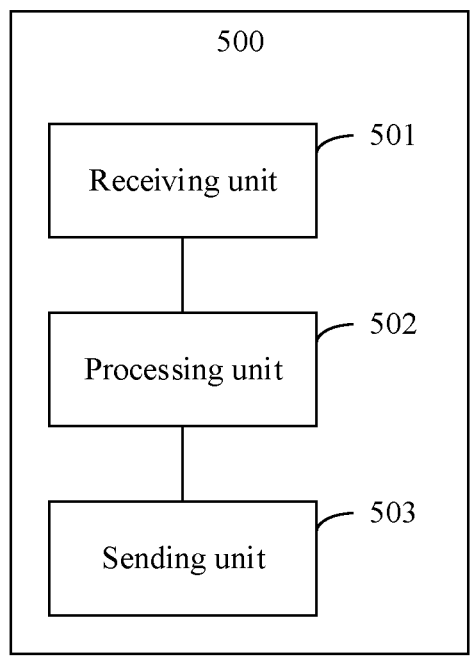
FIG. 5 is a schematic diagram of a structure of a data processing apparatus according to an embodiment of this application.

Refer to FIG. 5. An embodiment of this application provides a data processing apparatus 500. The apparatus 500 may be deployed on the host provided in the embodiment shown in FIG. 1, FIG. 2, or FIG. 3, and includes a receiving unit 501 and a processing unit 502.

The receiving unit 501 is configured to receive task information when a host switches to a secure mode, where the task information includes an identity of a virtual instance, the virtual instance is a virtual instance in a program running environment, and the program running environment is an environment in which the host operates in a non-secure mode.

The processing unit 502 is configured to establish or allocate a first isolation environment corresponding to the virtual instance based on the task information, where the first isolation environment is an environment in which the host operates in the secure mode, the first isolation environment includes an operating system in a secure mode and a resource allocated to the first isolation environment, the resource includes a first isolation space and a processor resource, the first isolation space is used to run the operating system and a secure processing program, and store to-be-processed data, the secure processing program corresponds to a program in the virtual instance, and is used to process the to-be-processed data, to implement a secure processing function of the program in the virtual instance, and the first isolation space is isolated from the program running environment.

Optionally, for a detailed process of establishing or allocating the first isolation environment by the processing unit 502, refer to related content in step 303 in the embodiment shown in FIG. 3. Details are not described herein again.

Optionally, the receiving unit 501 is configured to receive the task information sent by a security monitor, where the task information is information obtained by the security monitor in the non-secure mode.

Optionally, for a detailed process of receiving the task information by the receiving unit 501, refer to related content in step 301 in the embodiment shown in FIG. 3. Details are not described herein again.

Optionally, the task information further includes an address of a shared memory, and the processing unit 502 is further configured to:

obtain first data based on the address of the shared memory, where the first data includes the secure processing program and the to-be-processed data, and the shared memory is a memory shared by the program running environment and the first isolation environment.

Optionally, for a detailed process of obtaining the first data by the processing unit 502, refer to related content in step 303 in the embodiment shown in FIG. 3. Details are not described herein again.

Optionally, the host further includes a second isolation environment, and the second isolation environment includes the first isolation environment.

Optionally, the processing unit 502 is further configured to:

adjust an amount of resources included in the first isolation environment corresponding to the virtual instance that runs in the program running environment, or release the first isolation environment corresponding to the virtual instance that runs in the program running environment.

Optionally, the processing unit 502 is further configured to:

run the operating system in the secure mode in the first isolation space, and run the secure processing program by using the operating system to process the to-be-processed data, to obtain a processing result.

Optionally, for a detailed process of obtaining the processing result by the processing unit 502, refer to related content in step 304 in the embodiment shown in FIG. 3. Details are not described herein again.

Optionally, the processing unit 502 is further configured to: transmit the processing result to the program running environment, and trigger switching of a working mode of the host to the non-secure mode.

Optionally, for a detailed process of transmitting the processing result by the processing unit 502, refer to related content in step 305 in the embodiment shown in FIG. 3. Details are not described herein again.

Optionally, the processing unit 502 is further configured to obtain second data, where the second data includes status information and data stored in the first isolation space, the status information is used to describe a running status of the operating system in the first isolation environment and a running status of the secure processing program, and the second data is used to restore the first isolation environment corresponding to the virtual instance on another host.

Optionally, for a detailed process of obtaining the second data by the processing unit 502, refer to related content in step 307 in the embodiment shown in FIG. 3. Details are not described herein again.

Optionally, the apparatus 500 further includes a sending unit 503.

The sending unit 503 is configured to send the second data to the other host, to restore the first isolation environment corresponding to the virtual instance on the other host.

Optionally, the host may include a plurality of first isolation environments, and each of the plurality of first isolation environments is in a one-to-one correspondence with a virtual instance in the program running environment.

In this embodiment of this application, when the host switches to the secure mode, the receiving unit receives the task information and establishes the first isolation environment corresponding to the virtual instance, so that the host includes the program running environment and the first isolation environment. For the virtual instance included in the program running environment that operates in the non-secure mode, the first isolation environment corresponding to the virtual instance includes the operating system in the secure mode and the resource allocated to the first isolation environment, the resource includes the first isolation space and the processor resource, and the first isolation space is used to run the operating system and the secure processing program, and process the to-be-processed data. In this way, the processing unit processes the to-be-processed data in the first isolation environment, thereby improving security of processing the to-be-processed data.

Figure 6:
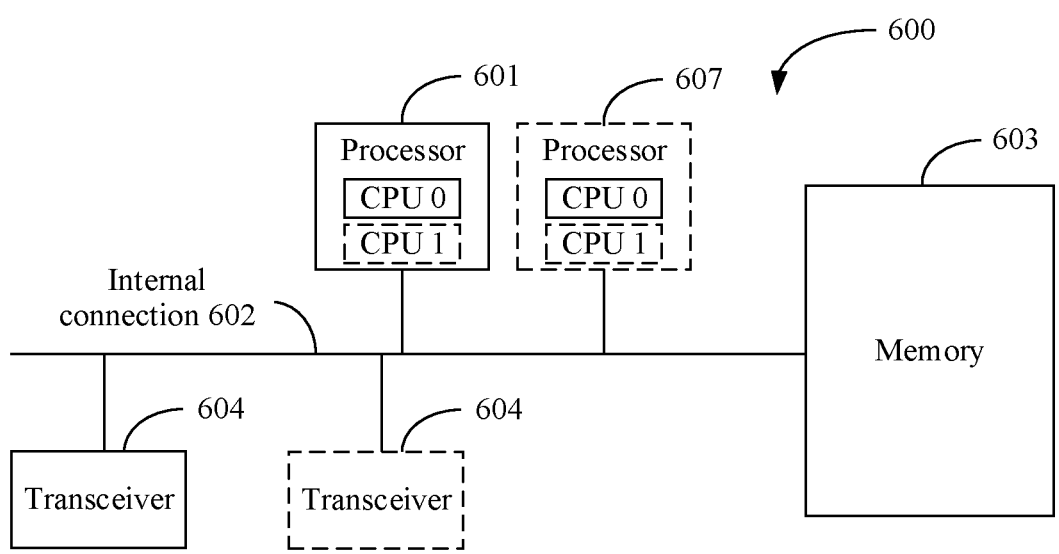
FIG. 6 is a schematic diagram of a structure of another data processing apparatus according to an embodiment of this application.

FIG. 6 is a schematic diagram of a data processing apparatus 600 according to an embodiment of this application. The apparatus 600 may be the host in any one of the foregoing embodiments. The apparatus 600 includes: at least one processor 601, an internal connection 602, a memory 603, and at least one transceiver 604.

The apparatus 600 is an apparatus of a hardware structure, and may be configured to implement function modules in the apparatus 500 shown in FIG. 5. For example, a person skilled in the art may figure out that the processing unit 502 in the apparatus 500 shown in FIG. 5 may be implemented by the at least one processor 601 by invoking code in the memory 603, and the receiving unit 501 and the sending unit 503 in the apparatus 500 shown in FIG. 5 may be implemented by the transceiver 604.

Optionally, the apparatus 600 may be further configured to implement functions of the host and the first management module and/or the second management module in the host in any one of the foregoing embodiments.

Optionally, the processor 601 may be a general-purpose central processing unit (central processing unit, CPU), a network processor (network processor, NP), a microprocessor, an application-specific integrated circuit (application-specific integrated circuit, ASIC), or one or more integrated circuits configured to control program execution of solutions of this application.

The internal connection 602 may include a path for transmitting information between the foregoing components. Optionally, the internal connection 602 is a board, a bus, or the like.

The transceiver 604 is configured to communicate with another device or a communication network.

The memory 603 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (electrically erasable programmable read-only memory, EEPROM), a compact disc read-only memory (compact disc read-only memory, CD-ROM) or another optical disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through the bus. The memory may alternatively be integrated with the processor.

The memory 603 is configured to store application program code for executing the solutions in this application, and the processor 601 controls execution. The processor 601 is configured to execute the application program code stored in the memory 603, and cooperate with the at least one transceiver 604, so that the apparatus 600 implements functions in the method in this patent.

During specific implementation, in an embodiment, the processor 601 may include one or more CPUs, for example, a CPU 0 and a CPU 1 in FIG. 6.

During specific implementation, in an embodiment, the apparatus 600 may include a plurality of processors, for example, the processor 601 and a processor 607 shown in FIG. 6. Each of the processors may be a single-core processor (single-CPU) or a multi-core processor (multi-CPU). The processor may be one or more devices, circuits, and/or processing cores configured to process data (for example, computer program instructions).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments of this application, but are not intended to limit this application. Any modification, equivalent replacement, or improvement made within the concept and principle of this application should fall within the protection scope of this application.

What is claimed is:

1. A data processing method performed by a host of a computer system, the method comprising:

receiving task information when the host switches to a secure mode, wherein the task information comprises an identity of a virtual instance in a program running environment, and the host operates in a non-secure mode in the program running environment; and providing a first isolation environment corresponding to the virtual instance based on the task information, wherein the host operates in the secure mode in the first isolation environment, the first isolation environment comprising an operating system in the secure mode and a resource allocated to the first isolation environment, the resource comprising a first isolation space and a processor resource, the first isolation space being isolated from the program running environment and configured to run the operating system and a secure processing program and store to-be- processed data, the secure processing program corresponding to a program in the virtual instance and to process the to-be-processed data and to implement a secure processing function of the program in the virtual instance, the first isolation space being isolated from the program running environment, wherein:
  the host further comprises a second isolation environment, the second isolation environment including the first isolation environment and a first management module;
  managing the first isolation environment by the first management module; and
  the program running environment is managed by a second management module, the first management module and the second management module being connected through a security monitor to prevent direct communication between the first management module and the second management module.

2. The method according to claim 1, wherein the step of receiving task information comprises:
  receiving the task information sent by a security monitor in the non-secure mode.

3. The method according to claim 1, wherein the task information further comprises an address of a shared memory, and the method further comprises:
  obtaining first data based on the address of the shared memory, wherein the first data comprises the secure processing program and the to-be-processed data, and the shared memory is shared by the program running environment and the first isolation environment.

4. The method according to claim 1, further comprising:
  adjusting an amount of resources comprised in the first isolation environment corresponding to the virtual instance that runs in the program running environment, or releasing the first isolation environment corresponding to the virtual instance that runs in the program running environment.

5. The method according to claim 1, further comprising:
  running the operating system in the secure mode in the first isolation space, and running the secure processing program, by using the operating system, to process the to-be-processed data to obtain a processing result.

6. The method according to claim 5, further comprising:
  transmitting the processing result to the program running environment, and triggering switching of a working mode of the host to the non-secure mode.

7. The method according to claim 1, further comprising:
  obtaining second data, wherein the second data comprises status information and data stored in the first isolation space, the status information describes a running status of the operating system in the first isolation environment and a running status of the secure processing program, and the second data is used to restore the first isolation environment corresponding to the virtual instance on another host.

8. The method according to claim 7, further comprising:
  sending the second data to the a second host to restore the first isolation environment corresponding to the virtual instance on the second host.

9. The method according to claim 1, wherein the host comprises a plurality of first isolation environments, and each of the plurality of first isolation environments is in a one-to-one correspondence with a virtual instance in the program running environment.

10. A host in a computer system, comprising:
  a processor; and
  a memory coupled to the processor and storing instructions that, when executed by the processor, cause the host to:
    provide a program running environment and a first isolation environment;
    operate in a non-secure mode in the program running environment; and
    operate in a secure mode in the first isolation environment, wherein:
      the program running environment comprises a virtual instance operating in the non-secure mode, the first isolation environment corresponding to the virtual instance in the program running environment; and
    the first isolation environment comprises an operating system in the secure mode and a resource allocated to the first isolation environment, the resource comprising a first isolation space and a processor resource, the first isolation space being configured to run the operating system and a secure processing program and to store to-be-processed data, the secure processing program corresponding to a program in the virtual instance and to process the to-be-processed data to implement a secure processing function of the program in the virtual instance, and the first isolation space is isolated from the program running environment, wherein:
      the host further comprises a second isolation environment, the second isolation environment including the first isolation environment and a first management module;
      execution of the instructions by the processor further causes the first isolation environment to be managed by the first management module, and the program running environment to be managed by a second management module, the first management module and the second management module being connected through a security monitor to prevent direct communication between the first management module and the second management module.

11. The host according to claim 10, wherein when the host is switched to the secure mode, the processor is configured to:
  receive task information comprising an identity of the virtual instance; and
  establish the first isolation environment corresponding to the virtual instance based on the task information.

12. A data processing apparatus comprising:
  a processor; and
  a memory coupled to the processor and storing instructions that, when executed by the processor, cause the data processing apparatus to:
    receive task information when the data processing apparatus switches to a secure mode, wherein the task information comprises an identity of a virtual instance in a program running environment in a non-secure mode; and
    establish a first isolation environment in the secure mode corresponding to the virtual instance based on the task information, wherein the data processing apparatus operates in the first isolation environment, the first isolation environment comprising an operating system in the secure mode and a resource allocated to the first isolation environment, the resource comprising a first isolation space and a processor resource, the first isolation space being isolated from the program running environment and configured to run the operating system and a secure processing program and to store to-be-processed data, the secure processing program corresponding to a program in the virtual instance and to process the to-be-processed data and to implement a secure processing function of the program in the virtual instance, the first isolation space being isolated from the program running environment, wherein:

the data processing apparatus further comprises a second isolation environment, the second isolation environment including the first isolation environment and a first management module;

the first isolation environment is managed by the first management module; and the program running environment is managed by a second management module, the first management module and the second management module being connected through a security monitor to prevent direct communication between the first management module and the second management module and to control input of information from the host to an appropriate one of the first management module and second management module.

13. The data processing apparatus according to claim 12, wherein the processor is configured to receive the task information from a security monitor in the non-secure mode.

14. The data processing apparatus according to claim 12, wherein the task information further comprises an address of a shared memory, and the processor is further configured to:
obtain first data based on the address of the shared memory, wherein the first data comprises the secure processing program and the to-be-processed data, and the shared memory is shared by the program running environment and the first isolation environment.

15. The data processing apparatus according to claim 12, wherein the processor is further configured to:
adjust an amount of resources in the first isolation environment corresponding to the virtual instance that runs in the program running environment, or release the first isolation environment corresponding to the virtual instance that runs in the program running environment.

16. The data processing apparatus according to claim 12, wherein the processor is further configured to:
run the operating system in the secure mode in the first isolation space, and run the secure processing program, by using the operating system, to process the to-be-processed data to obtain a processing result.

17. The data processing apparatus according to claim 12, wherein the processor is configured to establish a plurality of first isolation environments, each of the plurality of first isolation environments is in a one-to-one correspondence with a virtual instance in the program running environment.

18. The method according to claim 1, wherein the security monitor triggers the host to switch between a secure mode and a non-secure mode.

19. The host according to claim 10, wherein execution of the instructions by the processor causes the security monitor to trigger the host to switch between a secure m ode and a non-secure mode.

20. The data processing apparatus according to claim 12, wherein the security monitor triggers the host to switch between a secure mode and a non-secure mode.

* * * * *